United States Patent [19]

Cook et al.

[11] Patent Number: 5,071,811

[45] Date of Patent: Dec. 10, 1991

[54] POLYOLEFIN CATALYSTS AND METHOD OF PREPARING AN OLEFIN POLYMER

[75] Inventors: Gregory A. Cook; Theodore R. Engelmann, both of Baton Rouge, La.

[73] Assignee: Paxon Polymer Company, L.P., Baton Rouge, La.

[21] Appl. No.: 603,089

[22] Filed: Oct. 25, 1990

Related U.S. Application Data

[62] Division of Ser. No. 422,469, Oct. 17, 1989, Pat. No. 5,037,910.

[51] Int. Cl.$^5$ .............................................. C08F 4/654
[52] U.S. Cl. .................................. 502/122; 502/124; 502/125; 526/124
[58] Field of Search ................. 502/102, 122, 124, 125

[56] References Cited

U.S. PATENT DOCUMENTS

| | | | |
|---|---|---|---|
| 4,105,846 | 8/1978 | Hoff et al. | 526/124 |
| 4,245,071 | 1/1981 | Kondo et al. | 502/113 X |
| 4,292,200 | 9/1981 | Berger et al. | 502/117 |
| 4,429,087 | 1/1984 | Capshew | 526/119 |
| 4,526,943 | 7/1985 | Fuentes et al. | 526/142 |
| 4,528,339 | 7/1985 | Coleman, III et al. | 526/127 |
| 4,804,726 | 2/1989 | Kondo et al. | 502/125 X |

FOREIGN PATENT DOCUMENTS 56-155205  12/1981  Japan.
118120  6/1984  Japan.

*Primary Examiner*—Patrick P. Garvin
*Attorney, Agent, or Firm*—Roger H. Criss

[57] ABSTRACT

A method of manufacturing a polyolefin using a catalyst system of an ingredient (A) and ingredient (B), with ingredient A being obtained through successive reaction steps. Ingredient A is prepared by forming a mixture of (1) the combination of (a) metallic magnesium or an oxygen-containing organic compound of magnesium with (b) a mixture of a monohydroxylated organic compound and a polyhydroxylated organic compound, and (2) oxygen-containing organic compounds of titanium. The resulting solution is reacted in sequence with (3) at least one first halogenated aluminum compound, (4) at least one silicon compound and (5) at least one second halogenated aluminum compound. Compounds 3 and 5 are added at temperatures not exceeding about 25° C. Ingredient B is an organometallic compound of metals from Group Ia, IIa, IIIa or IVa of the Periodic Table. The resulting free-flowing polyolefin is characterized by a large average particle size and small amount of fine particles.

13 Claims, No Drawings

POLYOLEFIN CATALYSTS AND METHOD OF PREPARING AN OLEFIN POLYMER

This application is a division of application Ser. No. 422,469, filed Oct. 17, 1989, and now U.S. Pat. No. 5,037,910.

BACKGROUND OF THE INVENTION

1. Field of the Invention

This invention relates to a catalyst for a polyolefin system and a method of preparing an olefin polymer using such catalyst.

2. Description of the Prior Art

The catalytic production of polyolefins, such as polyethylene, is well known. It is already known to use an inorganic or organic magnesium compound with a transition metal compound as a high activity catalyst.

In an attempt to prepare polymer particles having a low amount of fine particles, it has been suggested in Japanese application 59-118120 filed June 11, 1984, published as application 60-262802 on Dec. 26, 1985, to utilize a catalyst system that includes a mixture of an ingredient obtained by the reaction of magnesium, titanium, organoaluminum, silicon and halogenated aluminum compounds in sequence, and a catalyst ingredient which is an organometallic compound.

More particularly, it is disclosed in the Japanese application that a solid catalyst ingredient A is prepared by having a homogeneous solution of the combination of a metallic magnesium and a hydroxylated organic compound (or an oxygen-containing organic compound of magnesium) and an oxygen-containing organic compound of titanium react in succession with at least one kind of organoaluminum compound, then at least one kind of silicon compound and then at least one kind of halogenated aluminum compound. Catalyst ingredient A is mixed with an ingredient B which is at least one kind of an organometallic compound containing a metal from Group Ia, IIa, IIb, IIIa or IVa of the Periodic Table.

The reduction of the amount of fine particles of the polyolefin polymer is desirable for a number of reasons. The formation of deposits is inhibited during the polymerization reaction and during the processes of separation and drying of the polymer. Also, the scattering of fine particles of polymer outside of the system is prevented. In addition, separation and filtration of the polymer slurry is much easier because of the narrow particle size distribution, and the drying efficiency is enhanced due to the improvement in fluidity. Furthermore, during transportation of the polymer, bridging does not occur in the conduits or silos and problems with transferring the polymer are reduced.

Further, when the polymer is made by a multistage polymerization method, if the polymer has a wide particle size distribution, classification of the powder may occur in the reactor prior to transfer when the additive package is introduced and during the transportation stage after drying. Also, the quality of the polymer may be adversely affected since the physical properties typically are different for different particle diameters.

In addition, it is desirable to provide a polymer which has a narrow molecular weight distribution, as described in the Japanese application. This results in a polymer that has high impact strength.

Although it is stated in the Japanese application that excellent powder characteristics are obtained using the described type of catalyst system, it has been found that such catalysts still produce excessive amounts of polymer particles having a diameter less than 210 microns (referred to as fines) when used in a slurry reactor with an isobutane solvent.

It would be desirable to provide an improved catalyst system which results in less fines production, but does not adversely affect the narrow molecular weight distribution of the polymer and high catalyst activity disclosed in the aforementioned application.

SUMMARY OF THE INVENTION

In accordance with this invention, there is provided a method for preparing an olefin polymer, which method comprises polymerizing an olefin in the presence of a catalyst system comprising a combination of ingredients (A) and (B), wherein ingredient (A) is a solid catalyst obtained by the reaction of a homogeneous solution of (1) at least one of a mixture of (a) metallic magnesium and/or an oxygen-containing organic compound of magnesium and (b) the combination of at least one monohydroxylated organic compound and at least one polyhydroxylated organic compound in which each hydroxyl group is separated by at least four atoms in the molecule; and (2) at least one oxygen-containing organic compound of titanium, with, in sequence, (3) at least one first halogenated aluminum compound added at a temperature no higher than about 25° C.; then (4) at least one silicon compound; then (5) at least one second halogenated aluminum compound added at a temperature no higher than about 25° C.; and ingredient (B) is an organometallic compound containing a metal from Group Ia, IIa, IIb, IIIa or IVa of the Periodic Table.

Also in accordance with this invention, there is provided a catalyst useful for preparing an olefin polymer, the catalyst comprising a combination of ingredients (A) and (B), wherein ingredient (A) is a solid catalyst obtained by the reaction of a homogeneous solution of (1) at least one of a mixture of (a) metallic magnesium and/or an oxygen-containing organic compound of magnesium and (b) the combination of at least one monohydroxylated organic compound and at least one polyhydroxylated organic compound in which each hydroxyl group is separated by at least four atoms in the molecule; and (2) at least one oxygen-containing organic compound of titanium, with, in sequence, (3) at least one first halogenated aluminum compound added at a temperature no higher than about 25° C.; then (4) at least one silicon compound; then (5) at least one second halogenated aluminum compound added at a temperature no higher than about 25° C.; and ingredient (B) is an organometallic compound containing a metal from Group Ia, IIa, IIb, IIIa or IVa of the Periodic Table.

The high molecular weight magnesium alkoxides apparently increase the size and stability of the catalyst particles resulting from the reaction of the Mg-Ti solution with a halogenated aluminum compound. The catalyst particles and resulting polymer particles exhibit a lower tendency to fracture during residence in a loop reactor.

It has been surprisingly found that when a dihydroxylated organic compound with only 3 carbon atoms separating the hydroxyl groups is used in place of the polyhydroxylated organic compound, the resulting catalyst when employed with halogenated aluminum compound produced excessive amounts of polymer fines. The solution resulting from the reaction of this type of magnesium component with the titanium component has a low viscosity and the reaction product of the magnesium and the dihydroxylated organic compound having only 3 carbon atoms separating the hydroxyl groups is believed to be a cyclic magnesium hydroxide.

As mentioned above, the polyhydroxylated organic compound employed in the present invention has its hydroxyl groups separated by at least four atoms in the molecular. Preferably, these atoms are atoms of carbon, nitrogen, oxygen, silicon, sulfur or phosphorus, or combinations thereof. The most preferred polyhydroxylated organic compounds are dihydroxylated organic compounds.

The catalysts of this invention are particularly useful in the preparation of high density polyethylene using a loop reactor, at temperatures in the range of about 20° to about 110° C.

DESCRIPTION OF THE PREFERRED EMBODIMENTS

In the present invention, either metallic magnesium and/or an oxygen-containing organic compound of magnesium can be used as a reactant to prepare the solid catalyst ingredient A. Metallic magnesium is preferred, and may be in powder, particle, foil, ribbon or other shape As oxygen-containing compounds of magnesium, there may be employed magnesium alkoxides, for example, methylate, ethylate, isopropylate, decanolate, methoxylethylate and cyclohexanolate, magnesium alkyl alkoxides, for example, ethyl ethylate, magnesium hydroalkoxides, for example, hydroxymethylate, magnesium phenoixdes, for example, phenate, naphthenate, phenanthrenate and cresolate, magnesium carboxylates, for example, acetate, stearate, benzoate, phenyl acetate, adipate, sebacate, phthalate, acrylate and oleate, oximates, for example, butyl oximate, dimethyl glyoximate and cyclohexyl oximate, salts of hydroxamic acid, salts of hydroxylamine, for example, N-nitroso-N-phenylhydroxylamine derivative, enolates, for example, acetylacetonate, magnesium silanolates, for example, triphenyl silanolate, and complex alkoxides with magnesium and other metals, for example, $Mg[Al(OC_2H_5)_4]_2$, and the like. These oxygen-containing organomagnesium compounds may be used independently or as a mixture.

As the monohydroxylated organic compound used in combination with the polyhydroxylated organic compound, there can be mentioned alcohols, organosilanols and phenols. As alcohols, alicyclic alcohols or aromatic alcohols having 1 to 18 carbon atoms can be used. For example, methanol, ethanol, n-propanol, 2-propanol, n-butanol, 2-butanol, n-hexanol, 2-ethylhexanol, n-octanol, 2-octanol, n-stearyl alcohol, cyclopentanol, cyclohexanol, and the like can be mentioned. Organosilanols are those which have one hydroxyl group and the organic group of which is selected from the group of alkyl, cycloalkyl, arylalkyl, aryl, and alkylaryl having 1 to 12 carbon atoms. Examples of such organosilanols are trimethylsilanol, triethylsilanol, triphenylsilanol and t-butyldimethylsilanol. As phenols, phenol, cresol, xylenol, and the like can be mentioned. The monohydroxylated organic compounds may be used independently or as a mixture of two or more. The presently most preferred monohydroxylated organic compound is n-butanol.

As mentioned above, the polyhydroxylated organic compounds used in combination with the monohydroxylated organic compounds have their hydroxyl groups separated by at least four atoms. These are preferably atoms of carbon, nitrogen, oxygen, silicon, sulfur or phosphorus, or any combination thereof. Such compounds may be dihydroxylated organic compounds, such as straight or branched chain aliplatic diols, or alicyclic, heterocyclic or aromatic diols. These diols may have their hydroxyl groups separated by 4 to 50 atoms, more preferably 4 to 8 atoms. Examples of diols include 1,4-butanediol, 1,6-hexanediol, 2,5-dimethyl-2,5-hexanediol, diethylene glycol, 2,2'-thiodiethanol, n-ethyldiethanolamine, silanol terminated polydimethylsiloxanes and the like. Examples of the other classes of diols include 1,4-cyclohexanediol, dihydroxy-naphthalenes, quinizarin, 2,4-dihydroxypyridine, and the like.

As other polyhydroxylated organic compounds, there can be mentioned aliphatic, alicyclic and aromatic polyalcohols. Examples are glycerine, pyrogallol, pentaerythritol and the like. The polyhydroxylated organic compound may be used independently or two or more of such compounds may be employed.

The presently preferred of such compounds are the aliphatic diols, of 4 to 8 carbon atoms, particularly 1,4-butanediol.

The weight ratio of the polyhydroxylated organic compound to the monohydroxylated organic compound may vary. Preferably the polyhydroxylated compound is present in an amount of about 25 to 75% by weight of the total weight of the monohydroxylated compound and the polyhydroxylated compound, and more preferably, about 25 to about 50% by weight. It has been found with certain compounds that if the amount of the polyhydroxylated compound is too high, an undesirable increase in the viscosity of the mixture results.

When the solid catalyst ingredient (A) of the invention is made using metallic magnesium, it is preferable to add one or more substances which can react with metallic magnesium or form an addition compound with it, for example, polar substances such as iodine, mercuric chloride, alkyl halides, organic esters, organic acids and the like for the purpose of promoting the reaction.

As oxygen-containing organic compounds of titanium which are used with the magnesium or oxygen-containing organomagnesium compounds, compounds represented by a general formula $[TiO_a(OR^1)_b]_m$ may be used. $R^1$ represents a hydrocarbon group such as straight or branched chain alkyl group, cycloalkyl group, arylalkyl group, aryl group, alkylaryl group or the like, having 1 to 20, preferably 1 to 10, carbon atoms; a and b (with a $\geq 0$ and b$>$0) are numbers compatible with the valency of titanium, and m is an integer. It is desirable to use such oxygen-containing organic compounds in which $0 \leq a \leq 1$ and $1 \leq m \leq 6$.

As specific examples, titanium tetraethoxide, titanium tetra-n-propoxide, titanium tetra-i-propoxide, titanium tetra-n-butoxide (tetrabutyl titanate), hexa-i-propoxy dititanate and the like can be mentioned. The use of oxygen-containing organic compounds having several different hydrocarbon groups may also be used. These oxygen-containing organic compounds of titanium may be used independently or as a mixture of two or more. The presently preferred titanium compound is tetrabutyl titanate.

As the first halogenated organoalumium compounds which are the reactants described above in (3), there may be used compounds of the formula $R_n^2AlY_{3-n}$, in which $R^2$ represents a hydrocarbon group having 1 to 20 carbon atoms, preferably 1 to 8, Y represents a halogen atom, and n is a number such that $1 \leq n < 3$. $R^2$ is preferably selected from straight or branched chain alkyl, cycloalkyl, arylalkyl, aryl and alkylaryl groups. The halogenated organoaluminum compounds described above can be used alone or as a mixture of two or more compounds.

As specific examples of the halogenated organoaluminum compound, there can be mentioned diethylaluminum chloride, ethylaluminum sesquichloride, i-butylaluminum dichloride, and the like. It is also possible to employ aluminum compounds which form the desired compounds in situ, such as a mixture of triethylaluminum and aluminum trichloride. The presently preferred compound is diethylaluminum chloride.

As silicon compounds which are the reactants described above in (4), polysiloxanes and silanes may be used.

As polysiloxanes, there can be used siloxane polymers which have a chain, cyclic or three-dimentional structure and in the molecule of which there are included at various ratios and with various distributions one or two or more of the repeating units represented by a general formula

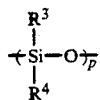

In the formula, $R^3$ and $R^4$ independently represent atoms or residues capable of bonding to silicon, such as hydrocarbon groups of alkyl or aryl groups, having 1 to 12 carbon atoms, hydrogen, halogen, alkoxyl groups, allyloxyl groups, fatty acid residue having 1 to 12 carbon atoms, and the like. In the formula, p represents normally an integer ranging from about 2 to about 10,000. However, all of $R^3$ and $R^4$ should not be hydrogen atoms or halogen atoms.

Specifically, there can be used as chain polysiloxanes, hexamethyldisiloxane, octamethyltrisiloxane, dimethylpolysiloxane, diethylpolysiloxane, methylethylpolysiloxane, methylhydropolysiloxane, ethylhydropolysiloxane. butylhydropolysiloxane, polymethylhydrogen siloxane, hexamethyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, dimethoxylpolysiloxane, diethoxylpolysiloxane, diphenoxylpolysiloxane and the like.

As cyclic polysiloxanes, there may be mentioned, for example, hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane, octaphenylcyclotetrasiloxane, and the like.

As polysiloxanes having a three-dimentional structure, for example, those in which chain or cyclic polysiloxanes described above were arranged by heating, etc. so as to have a crosslinking structure can be mentioned.

Such polysiloxanes preferably are in liquid state from a standpoint of handling and have a viscosity of about 1 to about 10,000 centistokes, preferably about 1 to about 1000 centistokes, at 25° C. However, they are not necessarily confined to liquids and may be solid matters as called silicone grease collectively.

As silanes, silicon compounds represented by a general formula $H_qSi_rR_s^5X_t$ can be used. In the formula, $R^5$ represents groups capable of bonding to silicon such as alkyl, aryl, alkoxyl, and allyloxyl groups, fatty acid residues, etc., having 1 to 12 carbon atoms. The $R^5$ groups may be of the same of different kinds; X represents halogen atoms which may be of the same or different kinds; q, s and t are integers not smaller than 0, and r is a natural number which is connected with q, s and t such that $q+s+t=2r+2$.

As specific examples, there can be mentioned, for example, silahydrocarbons such as trimethylphenylsilane, allyltrimethylsilane, etc., chain and cyclic organosilanes such as hexamethyldisilane, octaphenylcyclotetrasilane, etc., organosilanes such as methylsilane, dimethylsilane, trimethylsilane, etc., halogenated silicons such as silicon tetrachloride, silicon tetrabromide, etc. alkyl- and aryl-halogenosilanes such as dimethyldichlorosilane, n-buyltrichlorosilane, diphenyldichlorosilane, triethylfluorosilane, dimethyldibromosilane, etc., alkoxylsilanes such as trimethylmethoxylsilane, dimethyldiethoxylsilane, tetramethoxylsilane, diphenyldiethoxylsilane, tetramethyldiethoxyldisilane, dimethyltetraethoxyldisilane, etc., haloalkoxyl- and phenoxylsilanes such as dichlorodiethoxylsilane, dichlorodiphenoxylsilane, tribromoethoxylsilane, etc., silane compounds containing fatty acid residues such as trimethylacetoxysilane, diethyldiacetoxysilane, ethyltriacetoxysilane, etc., and the like.

The organosilicon compounds described above may be used independently or as a combination of two or more. The presently preferred compound is polymethylhydrogen siloxane.

As the second halogenated aluminum compounds which are the reactants described above in (5), those represented by a general formula $R_z^6 AlX_{3-z}$ may be used. In this formula, $R^6$ represents a hydrocarbon group having 1 to 20 carbon atoms, Preferably 1 to 8, X represents a halogen atom, 3 and z represents a number such that $1 \leq z \leq 3$. $R^6$ is preferably selected from straight or branched chain alkyl, cycloalkyl, arylalkyl, aryl, and alkylaryl groups. These halogenated aluminum compounds can be used independently or as a mixture of two or more. The second halogenated compound(s) of (5) may be the same or different from the compound(s) of (3) above.

As specific examples of the second halogenated aluminum compounds, there can be mentioned and for example, diethylaluminum chloride, ethylaluminum dichloride, i-butylaluminum dichloride, ethylaluminum sesquichloride and the like. It is also possible to employ aluminum compounds which form the desired compounds in situ, such as a mixture of triethyaluminum and aluminum trichloride and the like. The presently preferred compound is i-butylaluminum dichloride.

The solid catalyst ingredient (A) to be used in the invention can be prepared by allowing the reaction product obtained through the reaction between reactants (1) and (2) to react in sequence with reactant (3), then reactant (4) and then reactant (5).

It is preferable to conduct these reactions in the liquid medium For this reason, the reactions should be conducted in the presence of inert organic solvents particularly when these reactants themselves are not liquid under the operating conditions or when the amounts of the liquid reactants are not ample. As the inert organic solvents, those which are conventionally used may be employed. Of these, aliphatic, alicyclic or aromatic hydrocarbons, halogenated derivatives thereof, or mixtures thereof can be mentioned. For example, isobutane, hexane, heptane, cyclohexane, benzene, toluene, xylene, monochlorobenzene and the like can be used preferably.

The amounts of the reactants to be used in the invention are not particularly confined, but the atomic ratio of gram atom of Mg in the magnesium compounds described above in (1) to gram atom of Ti in the titanium compounds described above in (2) is preferably about $0.05 \leq Mg/Ti \leq 200$, preferably about $0.2 \leq Mg/Ti \leq 100$. If the ratio of Mg/Ti is too large out of this range, it becomes difficult to obtain a homogeneous Mg-Ti solution at the time of the catalyst preparation or the activity of catalyst becomes low at the time of the polymerization. Inversely, if it is too small, the activity of the catalyst also becomes low resulting in the problems such as the discoloration of product, etc It is preferable to select the amount of organoaluminum compounds so that the atomic ratio of gram atom of Al in the halogenated aluminum compounds $R_n 2AlY_{3-n}$ (with n being $1 \leq n \leq 3$) described above in (3), hereinafter referred to as Al (3), multiplied by n to gram atom of Ti in the titanium compounds described above in (2) lies within the range of:

$$0.1 \times \frac{n}{n - 0.5} \leq \frac{n \times Al(3)}{Ti} \leq 100 \times \frac{n}{n - 0.5},$$

preferably $$0.5 \times \frac{n}{n - 0.5} \leq \frac{n \times Al(3)}{Ti} \leq 50 \times \frac{n}{n - 0.5}.$$

If $\frac{n \times Al(3)}{Ti}$ is too large out of this range, the activity of the catalyst becomes low, and, if it is too small, a result is incurred that the improvement in the powder characteristics cannot be achieved It is preferable to select the amount of silicon compounds so that the atomic ratio of gram atom of Mg in the magnesium compounds described above in (1) to gram atom of Si in the silicon compounds described above in (4) lies within a range of about $0.05 \leq Mg/Si$ 100, preferably about $0.5 \leq Mg/Si \leq 10$. If Mg/Si is too large out of this range, the improvement in the powder characteristics is insufficient. Inversely, if it is too small, the result is that the activity of the catalyst is low.

It is preferable to select the amount of the second halogenated aluminum compounds described above in (5) so that the atomic ratio of gram atom of Al in the aforementioned first halogenated aluminum compounds (3) [Al(3)] to gram atom of Al in the second halogenated aluminum compounds (5) (hereinafter referred to as Al(5)) lies within a range of about $0.05 \leq Al(3)/Al(5) \leq 10$ and to be $$0.5 \leq p \left( \text{with } p = \frac{X}{4 \times Ti + 2 \times Mg + s} \right),$$

wherein Ti and X indicate gram atoms of titanium and halogen, respectively, Mg indicates gram atom of metallic magnesium or that of Mg in the magnesium compounds and s indicates gram equivalent of alkoxyl group or allyloxyl group in the silicon compounds. Preferably, the atomic ratio is about $0.1 \leq Al(3)/Al(5) \leq 5$ and $0.8 \leq p$. If the atomic ratio Al(3)/Al(5) is out of this range, a result is incurred that the improvement in the powder characteristics cannot be achieved, and, if p is too small, the activity of the catalyst becomes low.

The reaction conditions at respective steps are not particularly critical. However, the addition of components (3) and (5) should be conducted at a temperature no higher than 25° C., preferably no higher than 15° C. The reaction steps may otherwise be conducted at a temperature ranging from about $-50$ to about 300° C., preferably from about 0° to about 200° C., for about 1 to about 6 hours, preferably about 2 to about 4 hours, in an atmosphere of inert gas under normal or applied pressure. It has been found that if the reaction temperature for components (3) and (5) is greater than about 25° C., the resulting polymer has a significant amount of fines.

The solid catalyst ingredient (A) thus obtained may be used as it is. But, it is preferably used in a form of a suspension within the inert organic solvent after filtering or decanting to remove the unreacted matters and by-products remained behind and washed several times with the inert organic solvent. A catalyst from which the inert organic solvent was removed by isolating after washing and heating under the normal or reduced pressure can also be used.

In the present invention, as the organometallic compounds of the metal belonging to Group Ia, IIa, IIb, IIIa or IVa of the Periodic Table which are the catalyst ingredient (B), organometallic compounds consisting of metals such as boron, lithium, magnesium, zinc, tin, aluminum, etc., and organic groups, and mixtures of such compounds can be mentioned.

As the organic groups described above, alkyl groups can be mentioned typically. As such alkyl groups, straight or branched chain alkyl groups having from 1 to 20 carbon atoms may be used. Specifically, for example, n-butyllithium, diethylmagnesium, diethylzinc, trimethylaluminum, triethylaluminum, triethylaluminum, tri-i-butylaluminum, tri-n-butylaluminum, tri-n-decylaluminum, tetraethyltin, tetrabutyltin and the like can be mentioned. In particular, the use of trialkylaluminum is preferable, which has straight or branched chain alkyl groups having 1 to 10 carbon atoms. The most presently preferred compound is tri-i-butylaluminum.

In addition to the above, as ingredients (B), alkylmetal hydrides which have alkyl groups having 1 to 20 carbon atoms can be used. As such compounds, diisobutylaluminum hydride, trimethyltin hydride and the like can be specifically mentioned. Moreover, alkylmetal halides which have alkyl groups having 1 to 20 carbon atoms, for example, ethylaluminum sesquichloride, diethylaluminum chloride and diisobutylaluminum chloride, and alkylmetal alkoxides which have alkoxy groups having 1 to 20 carbon atoms, for example, diethylaluminum ethoxide, or the like can be used.

In addition, organoaluminum compounds obtained through the reaction of trialkylaluminum or dialkylaluminum hydride which has alkyl groups having 1 to 20 carbon atoms with diolefins having 4 to 20 carbon atoms, for example, compounds such as isoprenylaluminum, can also be used. These organometallic compounds may be used independently or in combination of two or more.

As background, the components of (A) and (B) and their reactions are generally disclosed in the aforementioned Japanese published patent application 60-262802, the disclosure of which is expressly incorporated herein by reference.

The polymerization of olefin according to the invention can be carried out under the general reaction conditions used by the so-called Ziegler method. Namely, polymerization is carried out at a temperature of about 20° to 110° C. in a continuous or batch system. The polymerization pressure is not particularly confined, but the application of pressure, in particular, the use of 1.5 to 50 kg/cm$^2$ is suitable. The polymerization is carried out in the presence or in the absence of an inert solvent. As polymerization in the absence of inert solvent, so-called vapor phase polymerization, etc. can be mentioned. When the polymerization is carried out in the presence of an inert solvent, any such solvent generally used can be employed. Particularly, alkanes or cycloalkanes having 4 to 20 carbon atoms, for example, isobutane, pentane, hexane, cyclohexane and the like, are suitable.

The polymerization may be conducted through a single polymerization system, but the effect is particularly achieved by the adoption of a multistage polymerization system. The so-called multistage polymerization system means a system manufacturing through a plurality of polymerization processes consisting of a process to obtain a polymer of a relatively low molecular weight component and a process to obtain that of a relatively high molecular weight component. Such multistage or cascade polymerization processes are well known. An example of such multistage polymerization is disclosed, for example, in U.S. Pat. No. 4,307,209, the disclosure of which is incorporated herein by references. In such a process, two or more polymerization steps are employed. Typically, in a first step an olefin polymer or copolymer having either a relatively high or relatively low molecular weight is produced. In a second step, an olefin polymer or copolymer having a relatively low molecular weight or relatively high molecular weight (opposite to that of the first step) is produced, typically in the presence of the product of the first step. The relatively low molecular weight product may have an intrinsic viscosity of 0.3 to 3, for example, and the high molecular weight component may have an intrinsic viscosity of 1 to 12, for example, and which is typically at least 1.5 times that of the low molecular weight component. The polymerization conditions are selected so that the weight ratio of the first and second components are within a range to provide a final polymerization product having the desired properties. Typically, the weight ratio of the low molecular weight component to the high molecular weight component may be between 30-60:40-70 The resulting polymer has a bimodal molecular weight distribution, and possesses desirable physical properties.

The amount of the catalyst ingredient (A) is to be used is preferably equivalent to about 0.001 to about 2.5 mmol of titanium atom per liter of the solvent or per liter of the reactor, and it can also be raised to higher concentrations depending on the conditions.

The organometallic compound which is the ingredient (B) is preferably used at a concentration of about 0.02 to about 50 mmol, preferably about 0.2 to about 5 mmol per liter of the solvent or per liter of the reactor.

In the method of preparing polyolefins according to this invention, as olefins to be allowed to polymerize, there can be mentioned $\alpha$-olefins represented by a general formula R—CH=CH$_2$ (in the formula, R is hydrogen or a straight or branched chain, substituted or unsubstituted alkyl group having 1 to 10, preferably 1 to 8, carbon atoms). Specifically, ethylene, propylene, 1-butene, 1-pentene, 4-methyl-1-pentene, 1-octene and the like may be mentioned. Moreover, copolymerization can also be carried out using mixtures of two or more olefins described above or mixtures of $\alpha$-olefin with dienes such as butadiene, isoprene, etc. In such copolymers of ethylene, preferably the non-ethylene comonomer is present in an amount from about 0.05 to 10, more preferably about 0.1 to 5, percent by weight. In particular, it is preferable to use ethylene, mixtures of ethylene with aforementioned $\alpha$-olefins except ethylene, or mixtures of ethylene with dienes. The presently preferred polymers are homopolymers of ethylene or copolymers of ethylene and a minor amount of hexene.

In the present invention, the molecular weight of the formed polymer can be controlled by generally known methods, such as allowing proper amount of hydrogen to exist in the reaction system, etc.

The concentration of hydrogen to control the molecular weight is ordinarily about 0.001 to 20 to the concentration of olefin when expressed as a ratio, partial pressure of hydrogen/partial pressure of olefin. For example, with a multistage polymerization, it is selected to be about 0.01 to 20 in the process of the low molecular weight component and about 0 to 0.1 in the process of the high molecular weight component. Here, it is necessary to select the molecular weights of both the low molecular weight component and the high molecular weight component aiming at an average molecular weight consistent with that of the object polymer and that the difference of molecular weights between them meets the width of the molecular weight distribution of the object polymer.

The present invention provides a polymer with excellent powder characteristics. Namely, according to this invention, a polymer with high bulk density can be obtained which has also an extremely narrow particle size distribution, contains only small amounts of fine particles and further has an average particle diameter of desired size. These are all of great significance industrially. In other words, in the polymerization process, the formation of the deposits is hindered in the polymerization reactor and in the processes of separation and drying of polymer, the scattering of the fine particles of polymer to outside of system is prevented as well as the separation and the filtration of polymer slurry become easy. In addition, the drying efficiency is enhanced due to the improvement in the fluidity. Moreover, at the transportation stage, the bridging, etc. does not occur in the silo and the troubles on transference are dissolved. Furthermore, it becomes possible to supply the polymer with constant quality.

A second effect of this invention is to be able to make the distribution of molecular weight narrower. As a result, a polymer having a high impact strength can be obtained.

EXAMPLES

The following non-limiting examples are given. In the examples and comparative examples, HLMI/MI means a ratio of high load melt index (HLMI, in accordance with the condition F in ASTM D-1238) to melt index (MI, in accordance with the condition E in ASTM D-1238). If the value of HLMI/MI is small, the molecular weight distribution is considered too narrow.

The activity indicates the formation weight (g) of the polymer per 1 g of the solid catalyst ingredient (A) The polyethylene powder obtained from solid catalyst component (A) in a steel autoclave is placed in a grinder prior to particle size analysis. The grinding action is designed to mimic the forces applied to like polyethylene produced in a loop reactor. The distribution of polymer particles is expressed by the difference in the 84% and 16% cumulative weights divided by the 50% cumulative weight (hereinafter referred to as span) obtained by the generally known method from the approximate straight line through the points plotting the result of the classification of polymer particles with sieves on the probability logarithm paper.

Moreover, the average particle diameter is a value read off the particle diameter corresponding to 50% cumulative value in weight with which the above-mentioned approximate straight line intersects.

EXAMPLE 1

(a) Preparation of Mg-Ti Solution

To a 1-liter 4-neck flask equipped with a mechanical stirrer, condenser, and thermocouple, was charged 68.0 ml (0.20 mole) tetrabutyl titanate and 12.2 g (0.50 mole) magnesium powder. The contents of the flask were stirred and heated to 80° C. under nitrogen. In a separate 500-ml 3-neck flask, 50.6 ml (0.55 mole) n-butanol, 24.4 ml (0.275 mole) 1,4-butanediol, and 0.61 g iodine were added and stirred until a homogeneous solution was obtained. The alcohol solution was added dropwise to the 1-liter flask while maintaining a temperature of 75°–85° C. Following the addition (1.5 hours), the mixture was heated to 120° C. for 2 hours. The resulting Mg-Ti solution was cooled to 60° C. and diluted with approximately 500 ml hexane. The solution was then aged for 1 hour at 70° C.

(b) Preparation of Solid Catalyst Component (A)

The Mg-Ti solution was transferred to a graduated 3-liter vessel equipped with a mechanical stirrer and condenser. Diethylaluminum chloride (30% in hexane) (522 ml, 1.0 mole) was added dropwise to the Mg-Ti solution at 15° C. Following a 1-hour addition time, the mixture was aged for 1 hour at 65° C. After the ageing step, 60 ml (1.0 mole) polymethylhydrogen siloxane was added, and the mixture was aged an additional hour at 65° C. The mixture was then cooled to 15° C., and 1009 ml (2.75 mole) iso-butylaluminum dichloride (50% in hexane) was added dropwise over a 2-hour period. Following the addition, the catalyst slurry was heated to 65° C. and stirred for 1.5 hours. Four washing steps were carried out using the decantation method. A portion of the slurry was sampled and dried under vacuum. Results of the elemental analysis of this sample were: Ti 8.3%, Mg 10.6%, and Cl 62.2%.

(c) Polymerization of Ethylene

A 2-liter stainless steel autoclave fitted with an electro-magnetic stirrer was heated under nitrogen for several hours A portion of the slurry obtained above which contains 15 mg of the solid catalyst component (A) was injected into the autoclave. Subsequently, 1.0 l isobutane was charged to the reactor followed by the addition of 0.18 g (0.91 mmoles) tri-isobutylaluminum. After stabilizing the reactor temperature at 85° C., hydrogen was added until the total pressure was increased by 50 psia (3.5 kg/cm$^2$). Ethylene was then added to the autoclave and was fed continuously to maintain a total pressure of 398 psia (28.0 kg/cm$^2$). The polymerization was conducted for 1.5 hours at 85° C. Following completion of the polymerization, the ethylene flow as terminated, and the solvent and unreacted gases were purged from the reactor. Polyethylene powder was removed from the autoclave and dried at 50° C.

A total weight of 375 g polyethylene having a melt index of 0.75 g/10 min and an HLMI/MI ratio of 39.2 was produced The formation weight per 1 gram of the solid catalyst ingredient (A) (hereinafter referred to as activity) corresponded to 25000 g/g. Moreover, the average particle diameter was 429 microns, the span was 0.81 and the amount of fine particles below 210 microns was 12.0 wt. %.

EXAMPLE 2

(Comparative)

Using the procedure described in Example 1 (a), the 1,4-butanediol ingredient was replaced with 4.2 ml (0.275 mole) 1,3-butanediol. The resulting Mg-Ti solution was further treated as described in Example 1 (b). Elemental analysis of the solid catalyst was: Ti 7.6%, Mg 10.7%, Cl 57.4%.

Using 0.18 g of tri-isobutylaluminum and 15 mg of the solid catalyst component (A) obtained by the above-mentioned method, ethylene was polymerized under the similar conditions to those in Example 1 (c).

The melt index was 0.24 g/10 min, the HLMI/MI ratio was 36.7, and the activity was 14000 g/g. The average particle diameter was 246 microns, the span was 0.77 and the amount of fine particles was 35.8 wt. %.

EXAMPLE 3

(Comparative)

Using the procedure described in Example 1 (a), the Mg-Ti solution was treated as described in Example 1 (b) with the exception that diethylaluminum chloride and isobutylaluminum dichloride were added at 60° C. instead of 15° C. Elemental analysis of the solid catalyst was: Ti 8.4%, Mg 10.3%, Cl 65.1%.

Using 0.18 g of tri-isobutylaluminum and 15 mg of the solid catalyst component (A) obtained by the above-mentioned method, ethylene was polymerized under the similar conditions to those in Example 1 (c), except that the reactor temperature was 90.5° C.

The melt index was 0.73 g/10 min, the HLMI/MI ratio was 35.5, and the activity was 17200 g/g. The average particle diameter was 308 microns, and the amount of fine particles was 29.1 wt. %.

EXAMPLE 4

A 1-liter 4-neck flask equipped with a mechanical stirrer and distillation apparatus was charged with 68.0 ml (0.20 mole) tetrabutyl titanate, 57.2 g (0.50 mole) magnesium ethylate, 64.1 ml (0.70 mole) n-butanol, 17.7 ml (0.20 mole) 1,4-butanediol, and 0.2 ml water. The mixture was heated under nitrogen to 90° C., after which ethanol began to distill from the reaction vessel. As the distillation proceeded, the reaction temperature was allowed to rise to 120°-130° C. After approximately 60 ml of distillate had been collected, the mixture was heated at 120° C. for an additional hour. The clear gray solution was then diluted with 500 ml hexane and aged for 1 hour at 70° C. The resulting Mg-Ti solution was further treated as described in Example 1 (b). Elemental analysis of the solid catalyst was Ti 8.2%, Mg 10.6%, Cl 62.2%.

Using 0.18 g of tri-isobutylaluminum and 15 mg of the solid catalyst component (A) obtained by the above-mentioned method, ethylene was polymerized under the similar conditions to those in Example 1 (c), except that the reactor temperature was 90 5° C. and the total pressure was 405 psia (28.5 kg/cm$^2$).

The melt index was 0.12 g/10 min, the HLMI/MI ratio was 38.3, and the activity was 21700 g/g. The average particle diameter was 380 microns, and the amount of fine particles was 13.4 wt. %.

EXAMPLE 5

Using the procedure described in Example 4, the 1,4-butanediol ingredient was replaced with 26.3 ml (0.20 mole) N-ethyl diethanolamine. The resulting component was further treated as described in Example 1. (b). Elemental analysis of the solid catalyst was Ti 8.5%, Mg 9.9%, Cl 65.4%.

Using 0.18 g of tri-isobutylaluminum and 15 mg of the solid catalyst component (A) obtained by the above-mentioned method, ethylene was polymerized under the similar conditions to those in Example 1 (c) except that the reactor temperature was 210° F. (98.9° C.) and the total pressure was 424 psia (29.8 kg/cm$^2$).

The melt index was 1.65 g/10 min, the HLMI/MI ratio was 25.2, and the activity was 21500 g/g. The average particle diameter was 422 microns, the span was 0.72, and the amount of fine particles was 6.9 wt. %.

EXAMPLE 6

Using the procedure described in Example 4, the 1,4-butanediol ingredient was replaced with 29.2 g (0.20 mole) 2,5-dimethyl-2,5-hexanediol. The resulting Mg-Ti solution component was further treated as described in Example 1 (b). Elemental analysis of the solid catalyst was: Ti 7.5%, Mg 9.6%, Cl 60.7%.

Using 0.18 g of tri-isobutylaluminum and 15 mg of the solid catalyst component (A) obtained by the above-mentioned method, ethylene was polymerized under the similar conditions to those in Example 1 (c) except that the reactor temperature was 210° F. (98.9 ° C.) and the total pressure was 424 psia (29.8 kg/cm$^2$).

The melt index was 1.87 g/10 min, the HLMI/MI ratio was 31.0, and the activity was 16700 g/g. The average particle diameter was 369 microns, the span was 0.76, and the amount of fine particles was 7.6 wt. %.

EXAMPLE 7

(Comparative)

Using the procedure described in Example 1 (a), the 1,4-butanediol ingredient was replaced with 42.1 ml (0.55 mole) isopropanol. The resulting Mg-Ti solution component was further treated as described in Example 1 (b). Elemental analysis of the solid catalyst was: Ti 9.7%, Mg 11.3%, Cl 65.8%.

Using 0.18 g of tri-isobutylaluminum and 15 mg of the solid catalyst component (A) obtained by the above-mentioned method, ethylene was polymerized under the similar conditions to those in Example 1 (c).

The melt index was 0.53 g/10 min, the HLMI/MI ratio was 37.8, and the activity was 21000 g/g. The average particle diameter was 270 microns, the span was 0.80 and the amount of fine particles was 28.2 wt. %.

EXAMPLE 8

(Comparative)

Using the procedure described in Example 4, the 1,4-butanediol ingredient was replaced with 57.2 ml (0.55 mole) cyclohexanol and 50.3 ml (0.55 mole) n-butanol were used. The resulting Mg-Ti solution component was further treated as described in Example 1 (b). Elemental analysis of the solid catalyst was: Ti 9.3%, Mg 10.6%, Cl 60.8%.

Using 0.18 g of tri-isobutylaluminum and 15 mg of the solid catalyst component (A) obtained by the above-mentioned method, ethylene was polymerized under the similar conditions to those in Example 1 (c), except that the reactor temperature was 195° F. (90.5° C.) and the total pressure was 405 psia (28.5 kg/cm$^2$).

The melt index was 3.14 g/10 min, the HLMI/MI ratio was 31.4, and the activity was 41250 g/g. The average particle diameter was 289 microns, the span was 0.82 and the amount of fine particles was 19.2 wt. %.

In this diclosure, when referring to the groups of the Periodic Table, reference is made to the groups as defined in the Periodic Table of The Elements appearing in Lange's Handbook of Chemistry, McGraw-Hill Book Company, 13th Edition (1985). It is noted that the nomenclature of the groups of this invention is somewhat different than that appearing in the aforementioned Japanese published patent application 60-262802.

It can be seen that the present invention provides an improved catalyst system for olefin polymers. The resulting free-flowing polyolefin is characterized by a large average particle size and small amount of fine particles. At the same time, the desirable properties of narrow molecular distribution and high cataylst activity are retained.

What is claimed:

1. A catalyst useful for preparing an olefin polymer, said catalyst comprising a combination of ingredients (A) and (B), wherein ingredient (A) is a solid catalyst obtained by the reaction of a homogeneous solution of
   (1) at least one of a mixture of (a) metallic magnesium and/or an oxygen-containing organic compound of magnesium and (b) the combination of at least one monohydroxylated organic compound and at least one polyhydroxylated organic compound in which each hydroxyl group is separated by at least four atoms in the molecule; and
   (2) at least one oxygen-containing organic compound of titanium wherein the oxygen is directly attached to the titanium, with, in sequence,
   (3) at least one first halogenated aluminum compound added at a temperature no higher than about 25° C., said compound having the formula $R_n^2AlY_{3-n}$ wherein R² represents a hydrocarbon having 1 to 20 carbon atoms, Y is a halogen and $0 \leq n < 3$; then (4) at least one silicon compound selected from the group consisting of polysiloxanes and silanes, and mixtures thereof; then (5) at least one second halogenated aluminum compound selected from compounds having the formula $$R_z^6AlX_{3-z}$$

wherein R⁶ represents a hydrocarbon having 1 to 20 carbon atoms, X is a halogen and $0 \leq z < 3$, said compound being added at a temperature no higher than about 25° C., and ingredient B is an organometallic compound containing a metal from Group Ia, IIa, IIb, IIIa or IVa of the Periodic Table.

2. The catalyst of claim 1, in which in said at least one polyhydroxylated organic compound, each hydroxyl group is separated by at least four carbon atoms.

3. The catalyst of claim 2, wherein said polyhydroxylated organic compound is a dihydroxylated organic compound.

4. The catalyst of claim 3, wherein said dihydroxylated organic compound is a straight or branched chain diol.

5. The catalyst of claim 4, wherein said dihydroxylated organic compound is 1,4-butanediol.

6. The catalyst of claim 1, wherein said polyhydroxylated organic compound is selected from the group consisting of 1,4-butanediol, 1,6-hexanediol, 2,5-dimethyl-2,5-hexanediol, diethylene glycol, 2,2'-thiodiethanol, N-ethyldiethanolamine, silanol terminated polydimethylsiloxanes and mixtures thereof.

7. The catalyst of claim 3, wherein said polyhydroxylated organic compound is selected from the group consisting of 1,4-cyclohexanediol, dihydroxynaphthalenes, quinizarin, 2,4-dihydroxypyridine and mixtures thereof.

8. The catalyst of claim 1, wherein said polhydroxylated organic compound is selected from the group consisting of glycerine, pyrogallol, pentaerythritol and mixtures thereof 9. The catalyst of claim 1, wherein said monohydroxyalted organic compound is selected from the group consisting of alcohols, organosilanols and phenols, and mixtures thereof.

10. The catalyst of claim 9, wherein said monohydroxylated organic compound is selected from the group consisting of straight or branched chain aliphatic alcohols, alicyclic alcohols and aromatic alcohols having 1 to 18 carbon atoms, and mixtures thereof.

11. The catalyst of claim 10, wherein said monohydroxylated organic compound is n-butanol.

12. The catalyst of claim 1, wherein said titanium compound has the formula $[TiO_a(OR^1)_b]_m$, wherein R¹ represents a hydrocarbon radical, a and b are numbers compatible with the valency of titanium, with a $\geq 0$ and b > 0, and m is an integer.

13. A catalyst useful for preparing an olefin polymer, said catalyst comprising a combination of ingredients (A) and (B), wherein ingredient (A) is a solid catalyst obtained by the reaction of a homogeneous solution of (1) at least one of a mixture of (a) metallic magnesium and/or an oxygen-containing organic compound of magnesium and (b) the combination of at least one monohydroxylated organic compound and at least one polyhydroxylated organic compound in which each hydroxyl group is separated by at least four atoms in the molecule; and (2) at least one oxygen-containing organic compound of titanium having the formula $[TiO_a(OR^1)_b]_m$, wherein R¹ represents a hydrocarbon radical having 1 to 20 carbon atoms, a and b are numbers compatible with the valency of titanium with a $\geq 0$ and b > 0, and m is an integer, with, in sequence, (3) at least one first halogenated aluminum compound added at a temperature no higher than about 25° C., said compound having the formula $$R_n^2AlY_{3-n}$$

wherein R² represents a hydrocarbon having 1 to 20 carbon atoms, Y is a halogen and $0 \leq n < 3$, the atomic ratio of gram atoms of aluminum in said compound to the gram atoms of titanium in said titanium compound falling with the range of:

$$0.1 \times \frac{n}{n - 0.5} \leq \frac{n \times Al(3)}{Ti} \leq 100 \times \frac{n}{n - 0.5} ; \text{ then}$$

(4) at least one silicon compound selected from the group consisting of polysiloxanes and silanes, and mixtures thereof; said polysiloxane having the formula

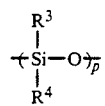

wherein R³ and R⁴ independently represent alkyl, aryl, alkoxyl, allyloxyl or fatty acids, having 1 to 12 carbon atoms, hydrogen and halogen, with the proviso that both R³ and R⁴ cannot both be hydrogen or halogen, and wherein p ranges from about 2 to about 10,000; and said silane having the formula $$H_qSi_rR_s^5X_t$$

wherein R⁵ is an alkyl, aryl, alkoxyl, allyloxyl or fatty acids having 1 to 12 carbon atoms; X is halogen; q, s, and t are integers not smaller than 0, and r is a natural number such that $$q+s+t=2r+2,$$

and wherein the amount of said silicon compound is selected such that the atomic ratio of gram atoms of magnesium in the magnesium compounds to the gram atoms of silicon in the silicon compounds lies within a range of about $0.05 \leq Mg/Si \leq 100$; then (5) at least one second halogenated aluminum compound selected from compounds having the formula $$R_z^6AlX_{3-z}$$

wherein R⁶ represents a hydrocarbon having 1 to 20 carbon atoms, X is a halogen and $0 \leq z < 3$, said compound being added at a temperature no higher than about 25° C., and wherein the amount of said second aluminum compound is such that the atomic ratio of gram atoms of aluminum in said first halogenated aluminum compound [Al(3)] to the gram atoms of aluminum in said second halogenated aluminum compound [Al(5)] lies within a range of about $0.05 \leq Al(3)/Al(5) \leq 10$; and ingredient B is an organometallic compound containing a metal from Group Ia, IIa, IIb, IIIa or IVa of the Periodic Table; said ingredient B being selected from the group consisting of alkylmetals, alkylmetal hydrides, alkyl metal halides, alkyl metal alkoxides, organoaluminum compounds obtained through the reaction of trialkylaluminum or dialkylaluminum hydride with diolefins, and mixtures thereof.

* * * * *